J. M. GALLOWAY.

SAFETY RAILROAD DEVICE.

APPLICATION FILED NOV. 19, 1913.

Reissued Apr. 6, 1915. 13,897.

Witnesses
Luna Stith
Richard F. Kirkpatrick

Inventor
James M. Galloway
By Cyrus Keir
Attorney

THE NORRIS PETERS CO., PHOTO-LITHO., WASHINGTON, D. C.

UNITED STATES PATENT OFFICE.

JAMES MARTIN GALLOWAY, OF SUNBRIGHT, TENNESSEE.

SAFETY RAILROAD DEVICE.

13,897. Specification of Reissued Letters Patent. Reissued Apr. 6, 1915.

Original No. 1,029,437, dated June 11, 1912, Serial No. 676,708. Application for reissue filed November 19, 1913. Serial No. 802,007.

*To all whom it may concern:*

Be it known that I, JAMES M. GALLOWAY, a citizen of the United States, residing at Sunbright, in the county of Morgan and State of Tennessee, have invented new and useful Improvements in Safety Railroad Devices, of which the following is a specification.

This invention relates to safety appliances for railway cars and has for an object to provide an appliance of this character which may be readily installed in the main train line pipe of an air brake system so as to be automatically operated to bleed the air line on derangement of a car supporting truck by the dropping of a brake beam or otherwise making prompt stopping of the train desirable.

Figure 1:
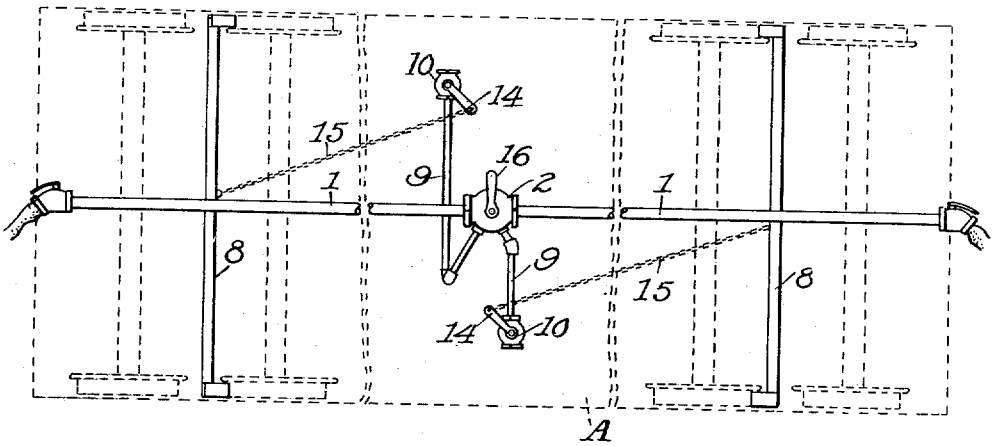
Figure 2:
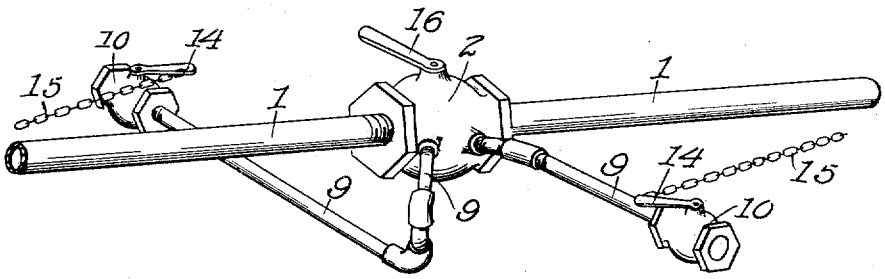
Figure 3:
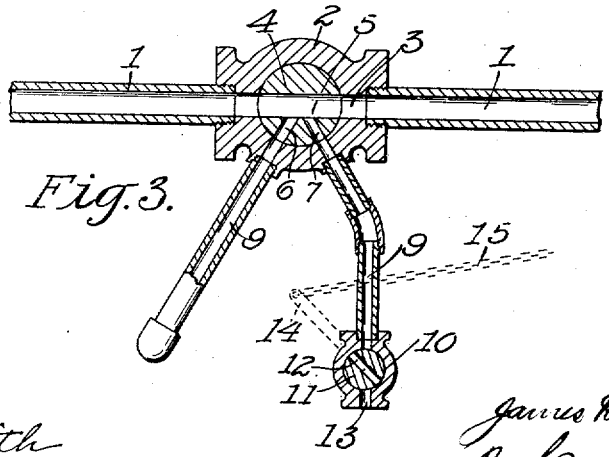

In the drawing forming a portion of this application and in which like letters of reference indicate similar parts in the several views, Figure 1 is a top plan view of the main train line pipe showing the application of the invention thereto and illustrating the connections between the bleeding valves and the brake beams and also illustrating a car conventionally equipped with the brake beams. Fig. 2 is a perspective view of a portion of the train line pipe showing the application of the invention thereto. Fig. 3 is a section through the train line valve and the train line pipe and through one of the bleeding valves.

In carrying the invention into practice, I provide a main train line pipe, 1, of an air brake system with a valve casing, 2, having the alining port way, 3, in communication with the train line pipe. In this casing is mounted a valve, 4, having a main port way, 5, and the branch port ways, 6 and 7.

The car, A, herein shown conventionally is provided with the usual brake beams, 8. The valve casing, 2, is provided with the oppositely extending conduits, 9, each of which has a valve casing, 10, in which the bleeding valve, 11, is rotatably mounted. The valve, 11, is provided with a port way, 12, which may be brought into registration with a similar port way, 13, in the valve casing so as to establish communication between the outside air and the train line pipe to effect a bleeding of the latter. The port ways, 13, in the valves, 11, are normally closed to the conduits, 9. Handles, 14, are mounted on the valves, 11, and they are connected by the chains, 15, or like suitable actuating devices to the front and rear brake beams of the car.

Now, it is stated that under the normal position of the valve, 4, the port way, 5, is in registration with the train line pipe while the port ways, 6 and 7, are in registration with the respective conduits, 9, the valves, 11, being closed to the outside air as is understood. When either one of the brake beams of the car falls one of the valves, 11, will be operated so as to bleed the train line pressure and effect therethrough the automatic application of the brakes.

The valve, 4, is provided with a handle, 16, to be actuated manually to close the train line to the conduits, 9, so as to prevent the undue loss of air when either conduit is deranged, turning said handle half way around closing the conduits and leaving the train line pipe open.

It is to be observed that said conduits are normally rigid or immovable relative to the train line, and since the latter is rigidly supported by the car body, it follows that the conduits and the casings of the bleeding valves are normally stationary relative to the car body.

I claim as my invention:

1. The combination with a car, of a train line air pipe, a branch leading from said pipe and normally stationary relative to said pipe, a three-way valve on said line pipe at the junction of said branch, and means on said branch pipe adapted to be actuated automatically for bleeding said branch pipe on derangement of a car supporting truck, substantially as described.

2. The combination with a car, of a train line air pipe, a branch leading from said pipe and normally stationary relative to said pipe, a three-way valve on said line pipe at the junction of said branch, and a bleeding valve located on said branch pipe and adapted to be actuated automatically on derangement of a car supporting truck, substantially as described.

3. In a safety appliance for cars, a car having a train line air pipe and a brake beam, a valve mounted in the train line pipe and provided with a main port way normally open to the train line and branch port ways normally open to the train line, conduits in open communication with the branch port ways, a bleeding valve located in each conduit and normally closed, and connections between the bleeding valve and the brake beam for opening the bleeding valve to the atmosphere on the fall of the beam from the car.

4. The combination with a car, of a train line air pipe, a branch leading from said pipe, a cut-off valve set into the train pipe to cut off both the train pipe and the branch, and bleeding mechanism in operative relation with said branch pipe and a car member movable during derangement relative to said branch pipe, substantially as described.

In testimony whereof I have signed my name, in presence of two witnesses, this sixth (6) day of November, in the year one thousand nine hundred and thirteen.

JAMES MARTIN GALLOWAY.

Witnesses:

ALBERT WILLIAMS,
W. A. ROCKWELL.

Copies of this patent may be obtained for five cents each, by addressing the "Commissioner of Patents, Washington, D. C."